United States Patent [19]

Itoh et al.

[11] Patent Number: 4,636,229

[45] Date of Patent: Jan. 13, 1987

[54] SELECTIVE GAS SEPARATION MEMBRANE

[75] Inventors: Hiroyuki Itoh; Ko Sakata, both of Kawasaki; Hirosuke Imai, Yokohama, all of Japan

[73] Assignee: Nippon Oil Company, Limited, Tokyo, Japan

[21] Appl. No.: 712,001

[22] Filed: Mar. 14, 1985

[30] Foreign Application Priority Data

Mar. 26, 1984 [JP] Japan ................................. 59-56285
Feb. 13, 1985 [JP] Japan ................................. 60-24507

[51] Int. Cl.$^4$ ............................................. B01D 53/22
[52] U.S. Cl. ........................................ 55/158; 55/16; 55/68
[58] Field of Search ............................ 55/16, 68, 158

[56] References Cited

U.S. PATENT DOCUMENTS

| | | | |
|---|---|---|---|
| 3,653,180 | 4/1972 | Juliano et al. ........................... | 55/16 |
| 3,899,309 | 8/1975 | Hoehn et al. ........................... | 55/158 X |
| 4,020,230 | 4/1977 | Mahoney et al. ..................... | 55/16 X |
| 4,029,582 | 6/1977 | Ishii et al. ............................. | 55/16 X |
| 4,239,793 | 12/1980 | Matsuura et al. .................... | 55/16 X |
| 4,393,113 | 7/1983 | Sugie et al. ............................ | 55/16 X |
| 4,406,673 | 9/1983 | Yamada et al. ........................ | 55/16 |
| 4,421,529 | 12/1983 | Revak et al. ........................... | 55/16 |
| 4,428,776 | 1/1984 | Li .............................................. | 55/16 X |
| 4,439,217 | 3/1984 | Yamabe et al. ....................... | 55/16 X |
| 4,533,369 | 8/1985 | Okita ....................................... | 55/16 X |

FOREIGN PATENT DOCUMENTS 152679 12/1979 Japan ..................................... 55/16
134629 10/1980 Japan ..................................... 55/16

OTHER PUBLICATIONS

Otsu et al., Polymers from 1,2-Disubstituted Ethylenic Monomers, 2$^{a)}$ Homopolymers from Dialkyl Fumarates by Radical Initiator, Makromol. Chem., Rapid Commun. 2, 725–728 (1981).

*Primary Examiner*—Robert Spitzer
*Attorney, Agent, or Firm*—Scully, Scott, Murphy & Presser

[57] ABSTRACT

A selective gas separation membrane comprising a fumaric diester polymer having a repeating unit represented by the following general formula (1):

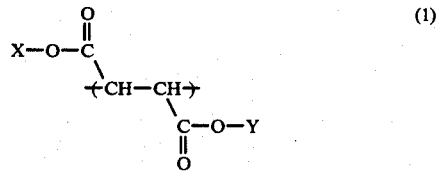

wherein X and Y are each independently an alkyl, cycloalkyl, aryl, trialkylsilylalkyl or siloxane-containing alkyl group.

16 Claims, No Drawings

SELECTIVE GAS SEPARATION MEMBRANE

BACKGROUND OF THE INVENTION

The present invention relates to a selective gas separation membrane and more particularly to a highly selective gas separation membrane formed of a polymer having fumaric diester units and suitable for separating and concentrating a specific component from a gaseous mixture.

It has long been known that a specific component can be separated and concentrated from a gaseous mixture by using a membrane formed of a polymeric material. This has recently attracted considerable attention from the standpoint of resources saving and energy saving. Particularly, if oxygen-enriched air with a high oxygen concentration can be obtained from air easily, inexpensively and continuously according to the membrane separation method, it is of great value. At present, the oxygen used for medical purposes such as the use thereof for incubators for immature infants or for therapy of patients suffering from diseases of the respiratory system is a pure oxygen filled in a cylinder. However, serious drawbacks are encountered in the use of such oxygen; for example, a troublesome operation is required and the oxygen cannot be fed continuously and must be diluted before use. But, if a highly efficient membrane capable of feeding oxygen in a concentrated state from air is obtained, the above drawbacks will be overcome, and it will become possible to use such oxygen even at home with the aid of an apparatus of a simple structure, and thus a great improvement can be expected in the medical field.

Further, if oxygen-enriched air can be fed easily and continuously by using a membrane also in various combustion systems presently in use such as, for example, industrial boilers and furnaces, iron household heaters, then the fuel consumption can be reduced at a higher combustion efficiency, that is, energy saving can be attained, and at the same time the problem of environmental pollution caused by incomplete combustion can be overcome. Moreover, if oxygen-enriched air can be fed easily and inexpensively by the use of a membrane, a further development can be expected also in other fields such as the food industry, aquaculture and waste disposal.

Polymeric materials presently known are more or less gas permeable, but in order to obtain an oxygen enriching membrane employable industrially, such materials must permit a sufficiently high permeation speed of oxygen and exhibit a large selectivity for oxygen relative to nitrogen. It has been known that the gas permeation speed is proportional to the permeation coefficient (usually represented by P in the unit of cm$^3$ (STP)cm/cm$^2$.sec.cmHg) peculiar to each polymeric substance, a differential pressure between both sides of a membrane and the surface area of the membrane and is inversely proportional to the membrane thickness. The selectivity for oxygen relative to nitrogen is determined by the ratio ($PO_2/PN_2$) of the oxygen permeation coefficient ($PO_2$) to the nitrogen permeation coefficient ($PN_2$) which values are peculiar to each polymeric substance. Therefore, in order to obtain a practical permeation speed, it is necessary to select a material having a large $PO_2$, or else it will become necessary to enlarge the differential pressure or the membrane surface area, thus resulting in increased size and complicated structure of the apparatus which employs the membrane. Moreover, in order to obtain a sufficient oxygen concentration, it is necessary to select a polymeric material having a high $PO_2/PN_2$ ratio. Further, the membrane thickness must be reduced in order to attain as high a permeation speed as possible, and to this end the material strength must be high.

Thus, oxygen enriching membrane materials employable industrially are required to have large $PO_2$ and $PO_2/PN_2$ values and be superior in strength and durability.

However, there is scarcely any known polymeric substance that satisfies the above requirements. Although a number of attempts have been made for improving known high polymers, none of them have fully attained the purpose. The following table shows examples of $PO_2$ and $PO_2/PN_2$ of known high polymers.

| Polymeric Material | $PO_2$(cm$^3$(STP)cm/cm$^2 \cdot$ s $\cdot$ cmHg) | $PO_2/PN_2$ |
|---|---|---|
| Polydimethylsiloxane | $3.5 \times 10^{-8}$ | 1.9 |
| Poly-4-methylpentene-1 | $3.0 \times 10^{-9}$ | 2.9 |
| Natural rubber | $2.3 \times 10^{-9}$ | 2.4 |
| Low density polyethylene | $2.9 \times 10^{-10}$ | 2.9 |
| Cellulose acetate | $4.3 \times 10^{-11}$ | 3.0 |

There are only an extremely limited number of known high polymers that have $PO_2$ values not smaller than $10^{-9}$. Examples are merely polydimethylsiloxane, poly-4-methylpentene-1 and natural rubber. Most of other known high polymers are of $PO_2$ values not larger than $10^{-10}$, so it is impossible for these high polymers to afford a membrane having a practical permeation speed unless the membrane area is made extremely large. Besides, the $PO_2/PN_2$ values of these high polymers are about 3 or so at the highest, and as the $PO_2$ value increases, the $PO_2/PN_2$ value decreases. Even known high polymers having $PO_2$ values not smaller than $10^{-9}$ are still unsatisfactory for the use being considered. For example, natural rubber has a small $PO_2/PN_2$ value and is poor in durability (especially in oxidation stability) because it has —C=C— double bond in the main chain, which is a serious drawback. Poly-4-methyl-1-pentene exhibits a high strength, but has the drawback that its $PO_2/PN_2$ value is small. Polydimethylsiloxane has the highest gas permeability among the high polymers presently known, but since its strength is poor, it is extremely difficult to form a membrane below 20 μ in thickness, and thus a practical permeation speed is not attainable despite of a large $PO_2$ of the material. Besides, its $PO_2/PN_2$ value of 1.9 is the smallest, and thus even polydimethylsiloxane is not employable at all for obtaining a highly oxygen-enriched air.

Thus, there is scarcely known any high polymer having a practical $PO_2$ value not smaller than $10^{-9}$, a high strength and a sufficiently large $PO_2/PN_2$ value. Under the circumstances, it has keenly been desired to develop a new material which satisfies these requirements.

SUMMARY OF THE INVENTION

It is the object of the present invention to provide a novel, selective gas separation membrane having a practical $PO_2$ value not smaller than $10^{-9}$, a sufficient strength and a $PO_2/PN_2$ value large enough to easily afford a highly oxygen-enriched air.

The membrane is formed of a fumaric diester polymer. The fumaric diester polymer used as the membrane has a repeating unit represented by the following general formula (1):

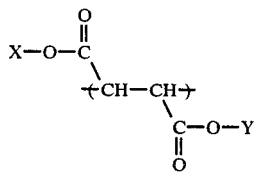

wherein X and Y, which may be the same or different, are each alkyl, cycloalkyl, aryl, trialkylsilylalkyl, or siloxane-containing alkyl.

DESCRIPTION OF PREFERRED EMBODIMENTS

Explanation will now be made about the substituent groups in the above general formula (1). As alkyl groups are preferred straight chain or branched alkyl groups having 1 to 10 carbon atoms. Typical examples are methyl, ethyl, propyl, isopropyl, n-butyl, sec-butyl, tert-butyl, isobutyl, n-pentyl, neopentyl, 1,1-dimethyl-2-ethylpropyl, n-hexyl, 2-ethylhexyl, 2,4,4-trimethyl-2-pentyl and n-decyl. Above all, bulky groups with no or less α-hydrogen such as isopropyl and tert-butyl are preferred.

As cycloalkyl groups are preferred those having 5 to 10 carbon atoms. Examples are cyclopentyl, cyclohexyl, cycloheptyl and cyclooctyl, with cyclopentyl and cyclohexyl being particularly preferred. These cycloalkyl groups may be substituted their hydrogen with substituent groups such as alkyl groups.

As aryl groups are preferred phenyl and substituted phenyl. As examples of substituted phenyl are mentioned phenyl groups resulting from substitution in any one or more of ortho, meta and para positions with alkyl groups such as methyl, ethyl, n-propyl, isopropyl, n-butyl and tert-butyl or polar groups such as methoxy, ethoxy, nitro, amino and halogen. Phenyl and alkyl-substituted phenyl groups are particularly preferred. As trialkylsilylalkyl groups are preferred those represented by the following general formula:

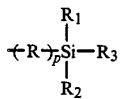

wherein R is a divalent hydrocarbon radical having 1 to 10, preferably 1 to 4, carbon atoms, $R_1$, $R_2$ and $R_3$ are each an alkyl group having 1 to 4 carbon atoms and p is an integer of 1 to 10, preferably 1 to 3. Typical examples are trimethylsilylmethyl, 1-trimethylsilylethyl, 2-trimethylsilylethyl, trimethylsilylpropyl, triethylsilylpropyl, 1-methyl-3-trimethylsilylpropyl, 1-ethyl-3-trimethylsilylpropyl, 1-methyl-4-trimethylsilylbutyl, 1-ethyl-4-trimethylsilylbutyl, methyldiethylsilylpropyl and t-butyldimethylsilylpropyl. Particularly preferred are trimethylsilylmethyl, 1-trimethylsilylethyl, 2-trimethylsilylethyl, trimethylsilylpropyl and 1-methyl-3-trimethylsilylpropyl.

As siloxane-containing alkyl groups are preferred those represented by the following general formula:

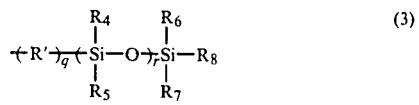

wherein R' is a divalent hydrocarbon radical having 1 to 10, preferably 1 to 4, carbon atoms, $R_4$, $R_5$, $R_6$, $R_7$ and $R_8$ are each an alkyl group having 1 to 4 carbon atoms, q is an integer of 1 to 10 and r is an integer of 1 to 100. Most preferred is the case where $R_4$ to $R_8$ are all methyl. As the value of r, it is preferably in the range of 1 to 30, more preferably 1 to 10.

In the case where X and Y in the formula (1) are the same, there is obtained a symmetric fumaric diester unit, while an asymmetric fumaric diester unit is obtained where the X and Y are different.

Symmetric fumaric diester is prepared in a known manner, for example by the reaction of fumaric acid and a corresponding alcohol, the reaction of fumaric chloride and a corresponding alcohol, the reaction of fumaric chloride and an alkali metal alkoxide of a corresponding alcohol, an ester interchange reaction of a fumaric diester and a different kind of alcohol, or an isomerization reaction of a maleic diester into a fumaric diester.

Asymmetric fumaric diester is prepared by first preparing a monoester having a predetermined X group and then diesterifying it using another alcohol corresponding to Y, or alternatively by first preparing a maleic monoester having a predetermined X group, then isomerizing it using, for example, thionyl chloride to obtain monomethylfumaric chloride and lastly reacting the latter with an alcohol corresponding to Y to effect diesterification.

In the present invention, the fumaric diester polymer is used as the essential component of the membrane. The fumaric diester polymer referred to herein indicates a fumaric diester homopolymer, copolymers of different two or more fumaric diesters as well as copolymers of one or more fumaric diesters, and one or more other vinyl monomers.

The polymerization can be carried out by known methods (for example, the method shown in Makromol. Chem. Rapid Commun. 2, 725 (1981)). The homopolymer or copolymers may be easily prepared by a bulk polymerization using a radical initiator such as azobisisobutyronitrile, any of various peroxides, a redox reagent or the like, or by a solution polymerization using a solvent such as benzene or toluene. Generally, the bulk polymerization is more preferable in view of polymerization activity and molecular weight of the polymer obtained. The polymerization may be carried out at a temperature between room temperature and 150° C., preferably between 30° C. and 100° C. The polymerization pressure is not limited. Any of normal, high and reduced pressures may be used. It is one of great advantages that the polymerization may be carried out by radical polymerization which can be easily and economically conducted in an industrial scale. The polymers obtained by other polymerization methods such as heat-, photo- or irradiation-polymerization may also be used.

In the present invention, in order to modify the physical properties such as strength, flexibility or membrane-forming ability, other vinyl monomers may often be copolymerized with the fumaric diester(s). The copolymerization proportion of the other monomers is preferably 80 mol % or less, more preferably 50 mol % or less. If the proportion of the other vinyl monomer units is more than 80 mol %, the characteristic features of the fumaric diesters will be disappeared.

Vinyl monomers to be used as comonomers include olefins such as ethylene, propylene, 1-butene, isobutene, 1-pentene or 4-methyl-1-pentene, dienes such as butadiene, isoprene or chloroprene, cyclopentadiene, halogenated olefins such as vinyl chloride, vinyl fluoride, vinylidene fluoride, tetrafluoroethylene or hexafluoroethylene, cyclic olefins such as cyclohexene, or vinyl cyclohexene, vinyl aromatic compounds such as styrene, α-methyl styrene, vinyl naphthalene or anthrathene, nitrogen-containing vinyl compounds such as vinyl pyridine, vinyl carbazole or vinyl pyrrolidone, acrylic acid or its ester, methacrylic acid or its ester, other vinyl esters such as vinyl acetate or vinyl pivalate, vinyl ethers such as methyl vinyl ester, ethyl vinyl ester, butyl vinyl ester or isobutyl vinyl ester, cyano group-containing olefins such as acrylonitrile or methacrylonitrile, amides such as acrylamide or methacrylamide, and silyl group-containing olefins such as trimethyl vinyl silane.

In formula (1), preferably in at least 20 mol % of fumaric diester repeating units in the fumaric diester polymer, one or both of the two ester groups are trialkylsilylalkyl ester or siloxane-containing alkyl ester. The proportion of such repeating units in the polymer is preferably 30 to 100 mol %, more preferably 40 to 100 mol %. In this case, also as the remaining proportion of repeating units it is preferable to use a repeating unit of the general formula (1) with X and Y being each an alkyl, cycloalkyl or aryl group.

The following are examples of preparing a fumaric diester polymer wherein at least part of the ester groups is a trialkylsilylalkyl ester or a siloxane-containing alkyl ester.

I. Homopolymerization of a fumaric diester wherein one or both of the ester groups are trialkylsilylalkyl ester or siloxane-containing alkyl ester, or copolymerization thereof with another fumaric diester.

II. Ester interchange of a fumaric diester polymer with a corresponding trialkylsilylalkyl alcohol or siloxane-containing alcohol.

III. Hydrolysis of a fumaric diester polymer for introduction therein of a predetermined quantity of carboxylic acid groups and subsequent esterification of the carboxylic acid groups using an alkylating agent such as trialkylsilylalkyl alcohol, siloxane-containing alcohol, trialkylsilylalkyl halide or siloxane-containing alkyl halide.

The polymerization or copolymerization in the method I can be performed in a known manner. For example, by a bulk polymerization using a radical initiator such as an azo compound, a peroxide or a redox reagent, or by a solution using benzene or toluene as a solvent, there can be easily obtained a homopolymer or copolymer. Generally, the bulk polymerization process is preferable because the polymerization activity is high and there can be obtained a high molecular weight polymer. The polymerization is performed at a temperature in the range of room temperature to 150° C., preferably 30° C. to 100° C. As to the polymerization pressure, any of atmospheric, pressurized and reduced-pressure conditions is adoptable. Under any of these pressure conditions the polymerization can be carried out without any trouble.

The method II can be easily effected by performing an ester interchange reaction of, for example, a tertiary alkyl ester such as di-t-butyl fumarate with a primary alcohol such as trimethylsilyl ethanol. The reaction is carried out using an acid or alkali catalyst in the presence of a large amount of a corresponding alcohol or while removing eliminated alcohol by distillation or any other suitable means. The reaction temperature is not specially limited, but it is generally desirable to make heating at a temperature in the range of 50° C. to 150° C. because the heating accelerates the reaction.

The carboxylic acid group-containing fumaric diester polymer (polyfumaric acid in the case of all the ester groups having been hydrolyzed) used in the method III can be obtained by the elimination of isobutylene through a partial or complete thermal decomposition of a di-t-butyl fumarate polymer, or by the elimination of isobutylene from such polymer using an acid. By suitably selecting conditions for heating and acid decomposition it is possible to obtain a fumaric diester polymer having a predetermined amount of carboxylic acid groups. According to another suitable method, a homopolymer of bistrimethylsilylfumarate or a copolymer of bistrimethylsilylfumarate with another fumaric diester is first prepared and then contacted with water to hydrolyze the bistrimethylsilylfumarate units in the polymer to introduce carboxylic acid groups therein. The thus-obtained fumaric diester polymer containing a predetermined quantity of carboxylic acid groups can be esterified by a known method. According to a suitable method for effecting the esterification completely, first a quaternary ammonium salt of carboxylic acid is formed using tetraethylammonium hydroxide, tetra-n-butylammonium hydroxide or tetra-n-butylammonium iodide, from which is then prepared a desired ester using an alkyl halide such as a trialkylsilylalkyl iodide or a siloxane-containing alkyl iodide in a solvent such as dimethylformamide or dimethyl sulfoxide. The reaction temperature is preferably in the range of room temperature to 150° C., more preferably 30° C. to 100° C. Also adoptable is a method in which esterification is performed using a corresponding alcohol and dimethylformamide dineopentyl acetal in a solvent such as dimethylformamide or dimethyl sulfoxide.

The molecular weight of the thus-obtained fumaric diester polymer is preferably in the range of 0.05 to 5.0, more preferably 0.1 to 3.0 and most preferably 0.5 to 3.0 in terms of instrinsic viscosity determined in benzene at 30° C. If the intrinsic viscosity is smaller than 0.05, it will be impossible to obtain a membrane having a practical strength, and the polymer having an intrinsic viscosity larger than 5.0 is not only difficult to manufacture but also inferior in its membrane forming characteristic.

The gas separation membrane of the present invention can be formed from the fumaric diester polymer easily by a membrane forming method known in this field, for example by a casting method. More specifically, since the solubility of the polymer in solvent differs, depending on the kind of the ester groups, there is used a solvent best suited to the polymer to prepare a casting solution, then the solution is cast over a glass plate or the like and dried to remove the solvent, whereby there is obtained a homogeneous membrane. The concentration of the casting solution is suitably in the range of 0.5 to 30%, preferably 1 to 20%. From the solution having such a concentration there is obtained a membrane having a thickness of 0.01 to 200μ. A smaller membrane thickness is desirable for the purpose of attaining a large gas permeation amount, and in this sense a membrane thickness in the range of 0.05 to 30μ is desirable. A thin membrane below 1μ can be obtained by a method known in this industry in which a solution of the polymer in a hydrophobic solvent is spread over the surface of water to evaporate the solvent and the resulting thin film is dipped up onto an organic or inorganic porous substrate. The membrane thus obtained can be used directly as a homogeneous membrane, or it may be put on a polymeric porous substrate such as cellulose acetate, polyamide, polycarbonate, polysulfone, polyether sulfone or polyolefin, an inorganic porous substrate such as glass or alumina, or a woven or non-woven cloth, to obtain a composite membrane having an enhanced strength. Further, no matter in what shape the membrane is, e.g. flat, tubular or hollow, it can exhibit its performance to a satisfactory extent. The membrane thus formed of the fumaric diester polymer alone can exhibit its characteristics, but even a membrane formed of a blend of the fumaric diester polymer with another high polymer, e.g. polyolefin or polyorganosiloxane, is also employable.

The fumaric diester polymer thus affords a strong film and yet has a large $PO_2$ value exceeding $10^{-9}$. Besides, the fumaric diester polymer with trialkylsilylalkyl ester or siloxane-containing alkyl ester introduced therein has a particularly large $PO_2$ value and also a large $PO_2/PN_2$ value not less than 3.5. The membrane formed of the fumaric diester polymer having such superior characteristics serves as an oxygen enriching membrane which affords a highly oxygen-enriched air, and is used in various combustion systems for medical, industrial and household service.

Further, the membrane of the present invention is employable not only for the purpose of oxygen enriching from air but also for the separation of a specific component from a mixture of various gases, for example, hydrogen, carbon monoxide, carbon dioxide, helium, argon, hydrogen sulfide, ammonia, as well as lower hydrocarbons such as methane, ethane, propane, butane, ethylene, propylene and butene.

The following examples are given to further illustrate the present invention, but it is to be understood that the invention is not limited thereto.

EXAMPLE 1

20.0 g. of diisopropyl fumarate prepared from fumaric acid and isopropyl alcohol and 0.16 g. of azobisisobutyronitrile were charged into a 100-ml. glass reactor, and after dissolution, polymerization was allowed to take place at 50° C. for 30 hours in a nitrogen gas atmosphere. Then, the reaction mixture was added into methanol to precipitate polymer. Reprecipitating operation was repeated in benzenemethanol system to purify the polymer. The intrinsic viscosity of the polymer determined in benzene at 30° C. (also in all of the following examples) was 1.18 and the yield thereof was 39%.

Then, a 15% solution of the polymer in benzene was cast over a glass plate to a thickness of 0.4 mm by means of a doctor blade knife. The thus-coated glass plate and dried for a day at room temperature and then further dried in vacuo at room temperature for 5 hours. The glass plate thus dried was immersed in water to allow the resultant film to separate from the glass surface. The film was a strong transparent film having a thickness of 31μ. It was set in a gas permeability measuring cell. Then, air was passed to the primary side of the membrane at a pressure of 2 kg/cm$^2$.G, and the flow rate and composition of oxygen-enriched air permeating through the membrane were analyzed to determine $PO_2$ and $PN_2$. As shown below, large $PO_2$ and $PO_2/PN_2$ values were obtained.

| | |
|---|---|
| $PO_2$ | $1.5 \times 10^{-9}$ cm$^3$(STP)cm/cm$^2$ · sec · cmHg |
| $PN_2$ | $3.1 \times 10^{-10}$ cm$^3$(STP)cm/cm$^2$ · sec · cmHg |
| $PO_2/PN_2$ | 4.8 |

EXAMPLES 2-7

Using 1 mol % based on the total monomer content of azobisisobutyronitrile, polymers were prepared in the same way as in Example 1, as set out in Table 1. Then, in the same manner as in Example 1, a film was formed on a glass plate from each polymer and determined for $PO_2$ and $PN_2$ values, results of which are shown in Table 2. The films were all strong films, and reference to Table 2 shows that the films exhibit a superior oxygen enriching performance, each having a large $PO_2$ exceeding $10^{-9}$ and a high $PO_2/PN_2$ ratio exceeding 4.

TABLE 1

| Example | Monomer(Note 1) | Feed (g) | Polymerization Conditions (°C. × hr) | Polymer Yield (%) | Intrinsic Viscosity of Polymer (@ 30° C.) | Copolymer Composition (molar ratio) |
|---|---|---|---|---|---|---|
| 2 | DEF | 17.2 | 50 × 40 | 29 | 0.38 | — |
| 3 | DCHF | 28.0 | 60 × 20 (in benzene) | 41 | 0.37 | — |
| 4 | DPF | 26.8 | 60 × 20 (in benzene) | 18 | 0.72 | — |
| 5 | MTBF | 28.6 | 60 × 20 | 40 | 0.51 | — |
| 6 | DTBF DIPF | 22.8 20.0 | 50 × 20 | 62 | 1.24 | DTBF/DIPF = 44/56 |
| 7 | DMF DIPF | 14.4 20.0 | 80 × 50 | 44 | 0.81 | DMF/DIPF = 32.68 |

(Note 1)DEF: diethyl fumarate
DPF: diphenyl fumarate
DTBF: di-tert-butyl fumarate
DCHF: dicyclohexyl fumarate
MTBF: methyl-tert-butyl fumarate
DMF: dimethyl fumarate

TABLE 2

| Example | Film Thickness (μm) | $PO_2$(Note 2) | $PN_2$(Note 2) | $PO_2/PN_2$ |
|---|---|---|---|---|
| 2 | 28 | $3.5 \times 10^{-9}$ | $8.3 \times 10^{-10}$ | 4.2 |
| 3 | 34 | $2.6 \times 10^{-9}$ | $5.6 \times 10^{-10}$ | 4.6 |

TABLE 2-continued

| Example | Film Thickness (μm) | $PO_2$ (Note 2) | $PN_2$ (Note 2) | $PO_2/PN_2$ |
|---------|---------------------|-----------------|-----------------|-------------|
| 4 | 32 | $1.2 \times 10^{-9}$ | $2.4 \times 10^{-10}$ | 5.0 |
| 5 | 27 | $5.4 \times 10^{-9}$ | $1.2 \times 10^{-9}$ | 4.1 |
| 6 | 41 | $3.0 \times 10^{-9}$ | $7.0 \times 10^{-10}$ | 4.3 |
| 7 | 37 | $1.9 \times 10^{-10}$ | $4.0 \times 10^{-10}$ | 4.7 |

(Note 2) Unit is the same as in Example 1.

EXAMPLE 8

Using 20.0 g. of diisopropyl fumarate, 8.6 g. of vinyl acetate and 0.32 g. of azobisisobutyronitrile, bulk polymerization was performed at 60° C. for 30 hours in the same way as in Example 1. The reaction mixture was dissolved in benzene and added into methanol to precipitate polymer. Reprecipitation was repeated twice in benzene-methanol system to purify the polymer. The yield of the polymer thus obtained was 21% and its intrinsic viscosity was 0.69. Further, as a result of analysis by nuclear magnetic resonance, the molar ratio of diisopropyl fumarate units to vinyl acetate units in the polymer was found to be 63:37. Then, in the same manner as in Example 1 a 33μ thick film was formed from a solution of this copolymer in benzene and determined for $PO_2$ and $PN_2$ values, results of which are as follows:

| | |
|---|---|
| $PO_2$ | $1.3 \times 10^{-9}$ cm$^3$(STP)cm/cm$^2 \cdot$ sec $\cdot$ cmHg |
| $PN_2$ | $2.6 \times 10^{-10}$ cm$^3$(STP)cm/cm$^2 \cdot$ sec $\cdot$ cmHg |
| $PO_2/PN_2$ | 4.9 |

EXAMPLE 9

Using 22.8 g. of di-tert-butyl fumarate, 10.4 g. of styrene and 0.32 g. of azobisisobutyronitrile, bulk polymerization was performed at 60° C. for 8 hours in the same way as in Example 1. The yield and intrinsic viscosity of the resultant polymer were 72% and 1.47, respectively, and the molar ratio of di-tert-butyl fumarate units to styrene units was 53:47. Then, a 22 μm thick film was formed from this polymer in the same manner as in Example 1 and then determined for $PO_2$ and $PN_2$ values, which were satisfactory as shown below.

| | |
|---|---|
| $PO_2$ | $2.4 \times 10^{-9}$ cm$^3$(STP)cm/cm$^2 \cdot$ sec $\cdot$ cmHg |
| $PN_2$ | $5.2 \times 10^{-10}$ cm$^3$(STP)cm/cm$^2 \cdot$ sec $\cdot$ cmHg |
| $PO_2/PN_2$ | 4.6 |

EXAMPLE 10

A 2% solution in benzene of the polydiisopropyl fumarate prepared in Example 1 was dropped a few drops onto the surface of water at 10° C. filled in a glass vessel. The drops immediately spread to form a thin film over the water surface. The benzene was evaporated while keeping the water surface as still as possible, and the resultant film was dipped up onto a porous polypropylene film (trade name: Juraguard 2500, a product of Polyplastics Co.) and then dried. Using the film thus obtained, the permeation speed of oxygen and that of nitrogen (referred to below as $QO_2$ and $QN_2$, respectively) in the same way as in Example 1. The following results were obtained:

| | |
|---|---|
| $QO_2$ | $5.2 \times 10^{-9}$ cm$^3$(STP)/cm$^2 \cdot$ sec $\cdot$ Hg |
| $QN_2$ | $1.1 \times 10^{-5}$ cm$^3$(STP)/cm$^2 \cdot$ sec $\cdot$ Hg |
| $QO_2/QN_2$ | 4.7 |

This $QO_2/QN_2$ value is about the same as that obtained in Example 1, showing that the thin film just obtained above is free from defect. The film thickness was calculated using the $PO_2$ and $PN_2$ values obtained in Example 1, which was found to be about 0.3μ.

EXAMPLE 11

The polydiisopropyl fumarate membrane obtained in Example 1 was set in the cell described in Example 1 and a gaseous mixture of carbon dioxide and nitrogen was passed to the primary side of the membrane at a pressure of 2 kg/cm$^2$.G to determine $PCO_2/PN_2$, which was found to be 28.6. In the same way, the separating performance of the membrane for a gaseous mixture of helium and nitrogen was checked. As a result, the $PHe/PN_2$ ratio was found to be 17.3.

By way of comparison, the same measurement was made with respect to poly-4-methyl-1-pentene and ethyl cellulose. As a result, as to poly-4-methyl-1-pentene, $PCO_2/PN_2$ and $PHe/PN_2$ ratios were 11.3 and 12.4, respectively, and as to ethyl cellulose, those ratios were 23.3 and 12.1, respectively. From these results it is apparent that the gas separation membrane obtained above from polydiisopropyl fumarate according to the present invention has a superior selective gas permeability.

REFERENCE EXAMPLE 1

20.0 g. of diisopropyl fumarate prepared from fumaric acid and isopropyl alcohol, 10.4 g. of bistrimethylsilyl fumarate prepared from fumaric acid and hexamethyldisilazane and 0.08 g. of azobisisobutyronitrile were charged into a 100-ml. glass reactor and stirred to give a homogeneous solution, and polymerization was performed at 60° C. for 30 hours in a nitrogen gas atmosphere. Then, the reaction mixture was dissolved in anhydrous tetrahydrofuran and the resultant solution was added into a large amount of anhydrous hexane to precipitate polymer. The precipitated polymer was vacuum-dried to yield 13.2 g. of a white polymer. The polymer was added into a mixed water/tetrahydrofuran solvent having a weight ratio of 5/95 and refluxed for 1 hour to hydrolyze the bistrimethylsilyl fumarate units in the polymer. The precipitated polymer was recovered, washed twice with tetrahydrofuran, then dried and subjected to measurement of NMR. As a result, the molar ratio of diisopropyl fumarate units to fumaric acid units in the polymer was 41/59.

EXAMPLE 12

5.0 g. of the polymer prepared in Reference Example 1 was dissolved in 100 ml. of dimethylformamide, then 17.1 g. of trimethyliodomethylsilane was added to obtain a homogeneous solution. Then, 42 g. of a 25% tetra-n-butylammonium hydroxide solution in dimethylformamide was dropwise added to the homogeneous solution over a period of 2 hours and reaction was made at room temperature for 120 hours to trimethylsilylmethylesterify the fumaric acid units in polymer. The reaction solution was added into methanol to precipitate polymer, followed by filtration and vacuum-drying to afford 4.8 g. of polymer. No carboxylic acid group was detected from NMR and IR spectra of this polymer, proving that the 59 mol % of fumaric acid units in the starting polymer had been trimethylsilylmethylesterified almost completely. The intrinsic viscosity of this polymer determined in benzene at 30° C. (all of the following intrinsic viscosity determinations were made under the same conditions) was 0.82.

Then, a 10% solution of the polymer in benzene was cast over a glass plate to a thickness of 0.4 mm by means of a doctor blade knife. The thus-coated glass plate was dried at room temperature for a whole day and night, then vacuum-dried at room temperature for 5 hours and then immersed in water to allow the film thereon to separate from the glass surface, followed by further drying in vacuo at 60° C. for 5 hours. The film thus obtained, which was a strong transparent film having a thickness of 25μ, was set in a gas permeability measuring cell, and air was passed to the primary side of the membrane at a pressure of 2 kg/cm².G. Under this condition, the flow rate and composition of oxygen-enriched air permeating through the membrane were analyzed to determine $PO_2$ and $PN_2$. As a result, large $PO_2$ and $PO_2/PN_2$ values were obtained as shown in Table 3.

EXAMPLES 13–21

In the same way as in Reference Example 1 and Example 12 membranes were formed from various fumaric diester polymers as shown in Table 3 and subjected to permeation measurement. From the results shown in Table 3 it is seen that all of the membranes have large $PO_2$ value.

TABLE 3

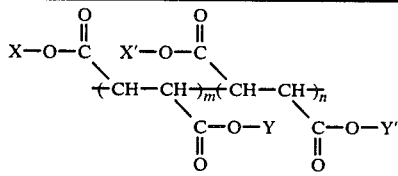

| No. | X | Y | X' | Y' | m/n | Intrinsic Viscosity dl/g | Film Thickness μm | $PO_2$ cm³(STP)cm cm².sec.cmHg | $PO_2/PN_2$ |
|---|---|---|---|---|---|---|---|---|---|
| Example 12 | —CH₂SiMe₃ | —CH₂SiMe₃ | —i-Pr | —i-Pr | 59/41 | 0.82 | 25 | $9.1 \times 10^{-9}$ | 4.1 |
| Example 13 | —CH₂SiMe₃ | —CH₂SiMe₃ | —i-Pr | —i-Pr | 25/75 | 1.10 | 27 | $4.9 \times 10^{-9}$ | 4.6 |
| Example 14 | —CH₂SiMe₃ | —CH₂SiMe₃ | —i-Pr | —i-Pr | 100/0 | 0.93 | 28 | $1.3 \times 10^{-8}$ | 3.7 |
| Example 15 | —C₂H₄SiEt₃ | —C₂H₄SiEt₃ | —⟨H⟩ | —⟨H⟩ | 64/36 | 1.18 | 26 | $8.9 \times 10^{-9}$ | 4.0 |
| Example 16 | —C₂H₄SiMe₃ | —C₂H₄SiMe₃ | —t-Bu | —t-Bu | 42/68 | 0.73 | 26 | $9.5 \times 10^{-9}$ | 4.1 |
| Example 17 | —CH₂SiMe₃ | —CH₂SiMe₃ | —Me | —t-Bu | 85/15 | 0.68 | 27 | $8.1 \times 10^{-9}$ | 4.0 |
| Example 18 | —CH₂SiMe₃ | —CH₂SiMe₃ | —i-Pr | —n-Hx | 51/49 | 0.82 | 25 | $1.0 \times 10^{-8}$ | 3.9 |
| Example 19 | —C₃H₆SiMe₃ | —C₃H₆SiMe₃ | —⟨⟩ | —⟨⟩ | 32/68 | 0.43 | 30 | $5.8 \times 10^{-9}$ | 4.3 |
| Example 20 | —(CH₂)₃Si(Me)(Me)—O—Si(Me)(Me)—Me | —(CH₂)₃Si(Me)(Me)—O—Si(Me)(Me)—Me | —i-Pr | —i-Pr | 31/69 | 1.32 | 20 | $1.2 \times 10^{-8}$ | 3.5 |
| Example 21 | —CH₂—[Si(Me)(Me)—O]₂—Si(Me)(Me)—Me | —CH₂—[Si(Me)(Me)—O]₂—Si(Me)(Me)—Me | —Me | —t-Bu | 21/69 | 0.63 | 31 | $5.9 \times 10^{-9}$ | 4.4 |

EXAMPLE 22

23.0 g. of asymmetric fumaric diester containing methyl ester group and 1-trimethylsilylethyl ester group, prepared from fumaric chloride monomethyl ester and 1-trimethylsilyl ethanol, 10 g. of benzene and 0.08 g. of azobisisobutyronitrile were charged into a 100-ml. glass reactor and polymerization was conducted at 50° C. for 45 hours in a nitrogen gas atmosphere. Thereafter, the reaction mixture was dissolved in tetrahydrofuran and diluted thereby, then the solution was added into a large amount of methanol to precipitate polymer, followed by filtration and vacuum-drying. The yield of the polymer thus obtained was 3.2 g. and the intrinsic viscosity thereof was 0.39. Then, 2.0 g. of the polymer was dissolved in 8 ml. of tetrahydrofuran. Using the resultant solution, there were performed film formation and permeation measurement in the same way as in Example 12. The film thus obtained was 32 μm thick and had large $PO_2$ and $PO_2/PN_2$ values as shown below.

| | |
|---|---|
| PO₂ | $1.3 \times 10^{-8}$ cm³(STP)cm/cm² · sec · cmHg |
| PN₂ | $3.6 \times 10^{-9}$ cm³(STP)cm/cm² · sec · cmHg |
| PO₂/PN₂ | 3.6 |

EXAMPLE 23

24.4 g. of asymmetric fumaric diester containing isopropyl ester group and trimethylsilylmethyl group prepared from fumaric chloride monoisopropyl ester and trimethylsilylmethanol, 15.0 g. of benzene and 0.08 g. of azobisisobutyronitrile were charged into a 100-ml. glass reactor and polymerization was conducted at 50° C. for 50 hours in a nitrogen gas atmosphere. Thereafter, the reaction mixture was dissolved in tetrahydrofuran and the solution was added into a large amount of methanol to precipitate polymer. The yield of the polymer after drying was 6.4 g. and its intrinsic viscosity was 0.48. Then, a 20% solution of the polymer in tetrahydrofuran was prepared, and using this solution there were performed film formation and permeation measurement in the same way as in Example 12. The film thus obtained was 30 μm thick and had a superior permeability as shown below.

| | |
|---|---|
| PO₂ | $1.5 \times 10^{-8}$ cm³(STP)cm/cm² · sec · cmHg |
| PN₂ | $4.3 \times 10^{-9}$ cm³(STP)cm/cm² · sec · cmHg |
| PO₂/PN₂ | 3.5 |

What is claimed is:

1. A selective gas separation membrane comprising a fumaric diester polymer having a repeating unit represented by the following general formula (1):

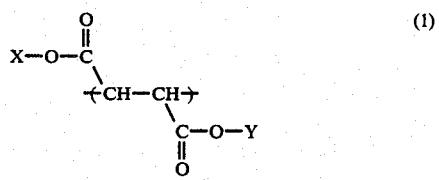

(1)

wherein X and Y are each independently an alkyl, cycloalkyl, aryl, trialkylsilylalkyl or siloxane-containing alkyl group.

2. A selective gas separation membrane as set forth in claim 1, wherein the X and Y in the general formula (1) are each independently an alkyl, cycloalkyl or aryl group.

3. A selective gas separation membrane as set forth in claim 1, wherein the membrane contains at least 20 mol % of a repeating unit of the general formula (1) in which the X and Y are each independently a trialkylsilylalkyl or siloxane-containing alkyl group.

4. A selective gas separation membrane as set forth in claim 3, wherein the membrane contains at least 40 mol % of a repeating unit of the general formula (1) in which the X and Y are each independently a trialkylsilylalkyl or siloxane-containing alkyl group.

5. A selective gas separation membrane as set forth in claim 1, wherein the membrane is composed of a copolymer containing at least 20 mol % of a repeating unit of the general formula (1).

6. A selective gas separation membrane as set forth in claim 5, wherein the membrane is composed of a copolymer containing at least 50 mol % of a repeating unit of the general formula (1).

7. A selective gas separation membrane as set forth in claim 1, wherein the alkyl group has 1 to 10 carbon atoms.

8. A selective gas separation membrane as set forth in claim 7, wherein the alkyl group is iso-propyl or tert-butyl.

9. A selective gas separation membrane as set forth in claim 1, wherein the cycloalkyl group has 5 to 10 carbon atoms.

10. A selective gas separation membrane as set forth in claim 1, wherein the cycloalkyl group is cyclopentyl or cyclohexyl.

11. A selective gas separation membrane as set forth in claim 1, wherein the aryl group is phenyl or substituted phenyl.

12. A selective gas separation membrane as set forth in claim 11, wherein the aryl group is phenyl or tert-butyl phenyl.

13. A selective gas separation membrane as set forth in claim 1, wherein the trialkylsilylalkyl group is represented by the following general formula:

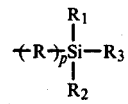

wherein R is a hydrocarbon radical having 1 to 10 carbon atoms, R₁, R₂ and R₃ are each an alkyl group having 1 to 4 carbon atoms and p is an integer of 1 to 10.

14. A selective gas separation membrane as set forth in claim 13, wherein the trialkylsilylalkyl group is trimethylsilylmethyl, 1-trimethylsilylethyl, 2-trimethylsilylpropyl or 1-methyl-3-trimethylsilylpropyl.

15. A selective gas separation membrane as set forth in claim 1, wherein the siloxane-containing alkyl group is represented by the following general formula:

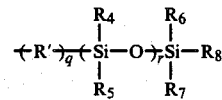

wherein R' is a divalent hydrocarbon radical having 1 to 10 carbon atoms, R₄, R₅, R₆, R₇ and R₈ are each an alkyl group having 1 to 4 carbon atoms, q is an integer of 1 to 10 and r is an integer of 1 to 100.

16. A selective gas separation membrane as set forth in claim 15, wherein the R₄, R₅, R₆, R₇ and R₈ in the general formula are each methyl and r is an integer of 1 to 10.

* * * * *